United States Patent [19]

Kawakubo et al.

[11] Patent Number: 4,882,103

[45] Date of Patent: Nov. 21, 1989

[54] PROCESS FOR PRODUCING CARBON PRODUCT HAVING COARSE AND DENSE STRUCTURE

[75] Inventors: Takamasa Kawakubo, Gunma; Mitsuru Yoshida, Fujioka; Yoshihisa Suda, Maebashi, all of Japan

[73] Assignee: Mitsubishi Pencil Co., Ltd., Tokyo, Japan

[21] Appl. No.: 118,162

[22] Filed: Nov. 9, 1987

[51] Int. Cl.$^4$ .................. B05D 3/02; C01B 31/02
[52] U.S. Cl. .................. 264/29.5; 264/29.6; 264/43; 264/59; 264/129; 427/227; 427/228; 423/449
[58] Field of Search ............ 264/29.5, 29.6, 42, 264/43, 44, 59, 85, 129, 134; 423/449; 427/227, 228

[56] References Cited

U.S. PATENT DOCUMENTS

| | | |
|---|---|---|
| 2,799,053 | 7/1957 | Gartland . |
| 3,322,866 | 5/1967 | Bentolila et al. .................. 264/29.5 |
| 3,619,430 | 11/1971 | Hiratsuka et al. . |
| 3,626,042 | 12/1971 | Appleby . |
| 3,772,115 | 11/1973 | Carlson et al. . |
| 3,856,574 | 12/1974 | Amagi et al. . |
| 3,957,957 | 5/1976 | Newman et al. .............. 264/29.5 X |
| 3,969,124 | 7/1976 | Stewart . |
| 4,221,773 | 9/1980 | Tsukagoshi et al. . |
| 4,366,191 | 12/1982 | Gistinger et al. .................. 427/228 |
| 4,490,201 | 12/1984 | Leeds . |
| 4,550,015 | 10/1985 | Korb et al. . |
| 4,582,632 | 4/1986 | Rokujo et al. . |
| 4,619,796 | 10/1986 | Awata et al. . |
| 4,619,805 | 10/1986 | Dias et al. . |
| 4,668,496 | 5/1987 | Korb et al. . |
| 4,687,607 | 8/1987 | Shigeta et al. . |

FOREIGN PATENT DOCUMENTS

| | | |
|---|---|---|
| 1152933 | 2/1960 | Fed. Rep. of Germany . |
| 48-67188 | 9/1973 | Japan . |
| 49-19999 | 5/1974 | Japan . |
| 53-125289 | 11/1978 | Japan . |
| 57-51109 | 3/1982 | Japan . |
| 57-209883 | 12/1982 | Japan . |
| 59-21511 | 2/1984 | Japan . |
| 59-21512 | 2/1984 | Japan .................. 423/449 |
| 59-204671 | 11/1984 | Japan . |
| 60-155570 | 8/1985 | Japan . |
| 60-191057 | 9/1985 | Japan . |
| 60-59171 | 12/1985 | Japan . |
| 62-35832 | 2/1987 | Japan . |
| 2083012 | 3/1982 | United Kingdom . |

*Primary Examiner*—Jeffery Thurlow
*Assistant Examiner*—Leo B. Tentoni
*Attorney, Agent, or Firm*—Oliff & Berridge

[57] ABSTRACT

A process for producing a carbon product having coarse and dense portions, the process including producing an integral porous carbon having high strength and uniform porosity distribution with dense structure carbon moldings. The carbon moldings are produced by calcining in an inert gas atmosphere a composite of (a) a green molding, a precarbonized material or a carbide and (b) chlorinated vinyl chloride resin particles, the chlorinated vinyl chloride resin producing, when carbonized in an inert gas atmosphere, a coarse structure. Dense carbon is formed by carbonizing the green molding, precarbonized material or carbide. Thus, the carbon product has coarse and dense portions.

8 Claims, No Drawings

PROCESS FOR PRODUCING CARBON PRODUCT HAVING COARSE AND DENSE STRUCTURE

BACKGROUND OF THE INVENTION

The present invention relates to a process for producing a carbon product of coarse and dense structure and, more particularly, to such a process for producing a carbon product having a coarse and dense structure in which coarse structure carbon moldings and dense structure carbon moldings are alternately constructed.

In this specification, carbon refers to both carbonaceous material and graphite, coarse structure means a structure made of porous carbon, and dense structure means a structure of carbon material which is formed by: (1) adding a binder and, as required, a filler, (2) precarbonizing the mixture, then (3) carbonizing it in an inert gas atmosphere. The structure of ultrafine crack at the binder section which is typically formed in the carbonizing step is not referred to as a porous structure. The moldings produced by mixing and kneading a mixed structure to obtain a dense structure, then shaping the mixture into an arbitrary shape by a molding machine is called "a green molding". Further, a carbonized material is produced by insolubilizing or infusibilizing the green molding by, for example, adding a carbonization accelerating catalyst, a crosslinking agent or a polymerization starter oxidizing, heating and crosslinking at 50° to 300° C. in an atmosphere of $Cl_2$, $O_3$, or air, or crosslinking and curing by emitting ultraviolet rays, an electron beam, or other radiation beam.

A carbon product has excellent oxidation resistance and medicine resistance, is not fusibly deformed in a nonoxidative atmosphere but exhibits excellent heat resistance and corrosion resistance. A porous material which is formed of carbon having such excellent properties may be utilized for various types of filters for isolating solid in liquid, as a catalytic carrier, as activated charcoal or adsorber by imparting or treating with a medicine, or for a light-weight structure, a heat insulator, electrodes for a battery, or a panel heater. Dense structure carbon moldings may be used for a heat exchanger distillation unit, an evaporator, an adsorber, a condenser, or a filter.

For producing a porous carbon, there exists a process comprising calcining a resin foam such as phenol or urethane. According to this process, the carbonization rate of resin is generally low, and the process has a drawback in that the formation of a starting material causes a large volumetric shrinkage due to the carbonization, thereby reducing the strength. As an improved process for eliminating the above-described drawbacks, a process for producing a porous carbon by carbonizing a mixture produced by impregnating resin foam such as phenol foam or urethane foam with resin such as epoxy or furan resin has been proposed. Further, a process has been disclosed for producing a carbon by mixing an amorphous or spherical carbon or graphite with resin, tar or pitches, molding the mixture and then carbonizing it (disclosed in Japanese Patent Application Laid-open No. 67,188/1973). However, the porous carbon produced by this process has relatively small porosity (L00 -L30) with relatively large apparent gravity. In addition, a process for producing a carbon by molding ultrafine carbonaceous hollow material and then carbonizing the material has also been proposed (Japanese Patent Publication No. 19,999/1974). According to this process, the carbon has relatively small apparent gravity (0.05 to 1.00) and most of the pores are independent, thereby providing extremely low ventilation. Further, there has been proposed a process for producing a porous carbon by introducing inflammable gas to thermosetting resin foam obtained by reacting directly the mixture with polyisocyanate and phenol resin or furan resin of its precarbonized material, breaking cell membranes by igniting the gas, and then carbonizing the material to provide continuous pores (Japanese Patent Application Laid-open No. 125,289/1978). Moreover, a process for producing a porous carbon by mixing an inorganic material or a carbonizable organic material, polyvinyl alcohol, aldehydes as a crosslinking agent and water soluble salts, solidifying the mixture, then solubilizing water soluble materials in water to form continuous pores and carbonizing the material has also been proposed (Japanese Patent Application Laid-open No. 51,109/1982). However, this method is disadvantageously complicated.

SUMMARY OF THE INVENTION

Accordingly, an object of the present invention is to provide a process for producing a carbon product of continuously irregular quality having coarse and dense portions by integrally producing a porous carbon product having a high strength and uniform porosity distribution with dense structure carbon moldings.

A carbon product having integrally produced coarse and dense structure has not yet been produced. However, to achieve the foregoing object of the present invention, a carbon product has been developed which is formed by calcining in an inert atmosphere a composite of (a) a composition of material selected from the group consisting of (1) a green molding, (2) a precarbonized material and (3) a carbide for producing a dense structure and (b) chlorinated vinyl chloride resin particles, thereby producing a coarse structure formed by the carbonized chlorinated vinyl chloride resin, thereby integrally forming a carbon product having coarse and dense portions.

DETAILED DESCRIPTION OF THE PREFERRED EMBODIMENTS

A process for producing a carbon product having a coarse and dense structure according to the present invention will now be described in more detail.

Green moldings are formed into dense structure carbon by carbonizing in an inert gas atmosphere. The green moldings are produced by uniformly mixing one or more of organic high molecular substances, asphalt pitches and dry distilled pitches in a mixing machine such as a Henschel mixer, then kneading the mixture by a kneader for highly applying shearing force such as a press kneader, two rolls, three rolls or cokneader under heating, and molding the kneaded mixture into an arbitrary shape such as a plate or rod by calender rolls, an extrusion molding machine or an injection molding machine. The green moldings are then precarbonized. The obtained precarbonized material is then carbonized by heating at a temperature of 800° C. or higher, and more preferably at 1000° C. to 3000° C. in an inert gas atmosphere such as nitrogen or argon, thereby obtaining a carbide. Suitable organic high molecular substances include thermoplastic resins such as polyvinyl chloride, polyacrylonitrile, polyvinyl alcohol, polyvinyl chloride-vinyl acetate copolymer; thermosetting resins such as phenol resin, furan resin, epoxy resin, unsaturated polyester; natural high molecular substances such as lignin and cellulose; and synthetic high molecular substances of a fundamental structure of a molecule with a condensate polycyclic aromatic group such as formalin condensate of naphthalenesulfonic acid. As the asphalt and pitches, petroleum asphalt, coal tar pitch, naphtha decomposed pitch or dry distillate lower than 400° C. of hydrocarbon compound of synthetic resin may be used.

Then, since the porous carbon may be bonded when in any of the carbonized states, i.e., when it is a green molding a precarbonized material or a carbide of arbitrary shape one or more of the organic high molecular substances, asphalt pitches, and dry distilled pitches may be coated thereon as a liquid composition. The organic high molecular substance is selected from a group which includes thermoplastic resins such as polyvinyl chloride, polyacrylonitrile; thermosetting resins such as phenol resin, furan resin, and natural high molecular substances such as tragacanth gum. The asphalt pitches include petroleum asphalt coal tar pitch. The organic high molecular substance and pitches to be used are preferably the same as those used for forming a dense structure portion to enhance bonding strength. The materials which are not liquid at the ambient temperature are dissolved in the liquid composition The bonding strength may be increased by adding 5 to 50 parts by weight of inorganic substance such as graphite or carbon black to the resin Then, the carbon product, which may be coated with a liquid composition, is deposited together with chlorinated vinyl chloride resin particles into a container of an arbitrary shape, the container regulating the shape. For example, to produce a laminated product of coarse and dense structure having a square bottom , chlorinated vinyl chloride resin particles are laid in a container having a square bottom, any of green moldings precarbonized material and/or carbide, preferably coated with a liquid composition, is placed on the particles, and chlorinated vinyl chloride resin particles are further laid thereon. This operation is repeated until the desired number of laminates is obtained. To produce a carbon product having a dense structure at the inside and a coarse structure at the outside, chlorinated vinyl chloride resin particles are filled in the container to form the outer portion of the product, and then any of acicular green moldings, precarbonized material and carbide coated with liquid compisition is inserted thereinto. The precarbonizing step is then performed or not performed as required, and the material is then carbonized by heating at 800° C. or higher, preferably at 1,000° C. or higher, in an inert gas atmosphere. Thus, the chlorinated vinyl chloride resin particles become porous carbon, thereby obtaining structure having a coarse structure integrally bonded to a dense structure carbon. The carbonizing temperature does not have an upper limit, and the material may be heated to approx. 3,000° C. as required. Since the chlorinated vinyl chloride resin particles are sintered to form a mesh structure without completely fusing the resin in the heating step and since they are carbonized, rigid porous carbon having continuous pores can be obtained. In order to obtain preferable bonding between the coarse structure and the dense structure, it is preferred to carbonize the material at a temperature increase rate of 3° to 100° C./hr. and more preferably 5° to 50° C./hr. up to 500° C. No particular limit exists for the rate of heating from 500° C. The carbonized carbon of the chlorinated vinyl chloride resin thus obtained as described above exhibits high strength. The chlorinated vinyl chloride resin particles thus used are produced by a postchlorinating process of the vinyl chloride resin particles. Chlorinated vinyl chloride resin produced in this way is a mixture composition polymer of (—CH$_2$—CHCl—) and (—CHCl—CHCl—). In order to increase the diameter of the particles in the pores of the porous carbon of coarse structure, particles of large diameter may be used. In order to decrease the diameter of the particles in the pores of the porous carbon, particles of small diameter may be used. A coarse and dense structure carbon product which has higher bonding strength between the coarse structure and the dense structure may be obtained by coating a small amount of chlorinated vinyl chloride resin particles on the coated surface before the green moldings, precarbonized material or carbide coated with liquid composition is inserted into the container, and then preliminarily curing until the liquid composition bonds the chlorinated vinyl chloride resin particles and the green moldings, the precarbonized material or the carbide.

EXAMPLES

The present invention will be more concretely described in the Examples which follow.

EXAMPLE 1

60 parts by weight of furan resin initial condensate (Hitafuran VF-302 produced by Hitachi Chemical Co., Ltd., Japan) and 40 parts by weight of chlorinated vinyl chloride resin powder (T-870 produced by Nippon Carbide Industries Co., Ltd., Japan) having 67% chlorine content and a polymerization of 740 were evenly mixed by a Henschel mixer. Then, the mixture was sufficiently kneaded by two heated rolls. After the mixture was kneaded, a plate having a thickness of 1.5 mm was molded by calender rolls. The obtained plate was placed in a heating oven, and precarbonized at 150° C. for 6 hours and then at 170° C. for 8 hours, thereby obtaining a precarbonized material. This plate was cut in a square of 50 mm (longitudinal)×50 mm (lateral), and furan resin initial condensate was coated on one side of the plate. Further, chlorinated vinyl chloride resin particles were placed thereon in a thickness of 1 mm. The coated plate was placed in a heated oven, heated at 100° C. for 1 hour, thereby preliminarily curing to bond the chlorinated vinyl chloride resin particles and the plate. The preliminarily cured coated plate was then placed with the coated surface disposed upside down in a spherical container having a diameter of 50 mm and chlorinated vinyl chloride resin particles were thrown in the container in a thickness of 20 mm. Subsequently, the coated plate was calcined by increasing the temperature 10° C./hr. from the ambient temperature to 300° C., 30° C./hr. from 300° C. to 500° C. and 200° C./hr. above 1,000° C., thereby obtaining carbon moldings having a coarse and dense structure after cooling. The size of the profile of the obtained coarse and dense structure was 35 mm (longitudinal)×35 mm (lateral)×15 mm (depth), and the thickness of the dense structure was 0.6 mm.

EXAMPLE 2

50 parts by weight of furan resin initial condensate (Hitafuran VF-302 produced by Hitachi Chemical Co., Ltd., Japan) 30 parts by weight of carbon black (Diablack produced by Mitsubishi Chemicals Industries Limited, Japan) and 20 parts by weight of chlorinated vinyl chloride resin powder (T-1482 produced by Nippon Carbide Industries Co., Ltd., Japan) were sufficiently mixed by a Henschel mixer. Then, the mixture was sufficiently kneaded by two heated rolls. After kneading, the mixture was pelletized by a pelletizer, and extruded by a screw extrusion molding machine, thereby obtaining rod moldings having 2 mm diameter. The rod moldings were then filled in a heated oven, precarbonized at 150° C. for 12 hours, calcined by increasing the temperature by 20° C./hr. up to 300° C., 50° C./hr. from 300° C. to 500° C., and 100° C./hr. from 500° C. to 1,000° C. in a nitrogen gas atmosphere, thereby obtaining carbon moldings having a dense structure. Subsequently, the moldings were into lengths of 30 mm, furan resin initial condensate was coated on the entire side surfaces, chlorinated vinyl chloride resin particles were bonded on the entire coated surface, and the thus-obtained structure was placed in a heated oven and preliminarily cured at 130° C. for 1 hour. After curing, the moldings were inserted into a cylindrical container having a diameter of 20 mm and a depth of 50 mm in which chlorinated vinyl chloride resin particles were contained. Thereafter, the moldings were calcined by increasing the temperature 10° C./hr. from the ambient temperature to 300° C., 20° C./hr. from 300° C. to 500° C. and 100° C./hr. from 500° C. to 1,000° C. Then, after cooling, the carbon molding having a coarse and dense structure was obtained. The size of outer profile of the coarse and dense structure was 13 mm in diameter×31 mm in length, and the diameter of the central dense structure was 1.7 mm in diameter.

EXAMPLE 3

80 parts by weight of chlorinated vinyl chloride resin particles (T-025 produced by Nippon Carbide Industries Co., Ltd., Japan), 20 parts by weight of graphite (average particle size 3 microns), and 15 parts by weight of dioctyl phthalate as a plasticizer were mixed in a Henschel mixer. Then, the mixture was sufficiently kneaded by two rolls. After the kneading, the kneaded mixture was pelletized by a pelletizer and extrusion molded by a plunger type hydraulic molding machine into a plate 30 mm (longitudinal)×5 mm (lateral). This plate was cut in lengths of 50 mm, thereby obtaining green moldings. Three moldings were prepared. Chlorinated vinyl chloride resin particles were dissolved in tetrahydrofuran to form a coating liquid which was coated on one surface of each of the first and third moldings and on both surfaces of the second molding. Subsequently, the first molding was placed in a container 30 mm×50 mm×50 mm, chlorinated vinyl chloride resin particles were laid on the coated surface in a thickness of 10 mm, the second molding was placed on the chlorinated vinyl chloride resin particles, a second layer of chlorinated vinyl chloride resin particles were laid on the second molding in a thickness of 10 mm, and the third molding was placed on the second layer. This laminate was calcined by increasing the temperature 10° C./hr. from the ambient temperature to 300° C., 20° C./hr. from 300° C. to 500° C., and 50° C./hr. from 500° C. to 1,500° C. in a nitrogen gas atmosphere. After cooling, a coarse and dense structure multilayer carbon was obtained. The outer profile was 26 mm×44 mm×30 mm, and the thickness of the dense structure was 4.5 mm.

What is claimed is:

1. A process for producing a carbon product having coarse and dense portions, the process comprising:
   calcining in an inert gas atmosphere a composite of
   (a) a composition of material selected from the group consisting of (1) a green molding, (2) a precarbonized material and (3) a carbide for producing a dense structure and
   (b) chlorinated vinyl chloride resin particles, thereby forming an integrally shaped composite,
   said integrally shaped composite being formed using at least one liquid composition positioned between a green molding and a precarbonized substance.

2. The process according to claim 1, wherein said composition comprises at least one material selected from the group consisting of high molecular organic substances, asphalt pitches and dry distilled pitches.

3. The process according to claim 1, wherein said composite comprises a laminate of (1) a green molding, a precarbonized substance or a carbide and (2) chlorinated vinyl chloride resin particles.

4. The process according to claim 1, wherein an interior portion of said composite is formed of a green molding, a precarbonized substance or a carbide and an exterior portion of said composite is formed of chlorinated vinyl chloride resin particles.

5. The process according to claim 1, wherein said calcining is performed by heating to at least 800° C.

6. A process for producing a carbon product having coarse and dense portions, the process comprising:
   calcining in an inert gas atmosphere a composite of
   (a) a composition of material selected from the group consisting of (1) a green molding, (2) a precarbonized material and (3) a carbide for producing a dense structure and
   (b) chlorinated vinyl chloride resin particles, thereby forming an integrally shaped composite
   said integrally shaped composite being formed using at least one liquid composition positioned between a carbide and chlorinated vinyl chloride resin particles.

7. A process for producing a carbon product having coarse and dense portions the process comprising:
   calcining in an inert gas atmosphere a composite of
   (a) a composition of material selected from the group consisting of (1) a green molding, (2) a precarbonized material and (3) a carbide for producing a dense structure and
   (b) chlorinated vinyl chloride resin particles, thereby forming an integrally shaped composite
   said integrally shaped composite being formed using at least one liquid composition including a material selected from the group consisting of organic high molecular substances, asphalt pitches and dry distilled pitches, the liquid composition being positioned between a green molding and a precarbonized substance.

8. A process for producing a carbon product having coarse and dense portions the process comprising:
   calcining in an inert gas atmosphere a composite of
   (a) a composition of material selected from the group consisting of (1) a green molding, (2) a precarbonized material and (3) a carbide for producing a dense structure and
   (b) chlorinated vinyl chloride resin particles, thereby forming an integrally shaped composite
   said integrally shaped composite being formed using at least one liquid composition including a material selected from the group consisting of organic high molecular substances, asphalt pitches and dry distilled pitches, the liquid composition being positioned between a carbide and chlorinated vinyl chloride resin particles.

* * * * *